United States Patent [19]

Dustrude

[11] Patent Number: 5,440,816
[45] Date of Patent: Aug. 15, 1995

[54] COLLAPSIBLE HANDSAW

[76] Inventor: Robert B. Dustrude, HC 1, Box 1771, Pengilly, Minn. 55775

[21] Appl. No.: 214,830

[22] Filed: Mar. 17, 1994

[51] Int. Cl.⁶ ............................................. B27B 21/00
[52] U.S. Cl. ....................................... 30/512; 30/506
[58] Field of Search ................. 30/507, 512, 506, 517, 30/166.3

[56] References Cited

U.S. PATENT DOCUMENTS

| | | | |
|---|---|---|---|
| 2,593,323 | 4/1952 | Magnussen et al. | 30/512 |
| 2,734,536 | 2/1956 | Harper | 30/506 |
| 2,910,101 | 10/1959 | Canfield | 30/506 |
| 3,191,648 | 6/1965 | Dustrude | 30/506 |
| 4,637,141 | 1/1987 | Allen | 30/512 |
| 5,208,986 | 5/1993 | Ryon et al. | 30/506 |

*Primary Examiner*—Hwei Siu Payer
*Attorney, Agent, or Firm*—Jerold M. Forsberg

[57] ABSTRACT

A collapsible handsaw which can be erected and collapsed without tools includes, in a first embodiment, a saw blade, a foldable frame, and a flexible binder. In this embodiment the frame includes two frame portions wherein each is connected by a pin to an opposite end of the saw blade and the single flexible binder is used to secure the free ends of the frame portions relative to one another when the handsaw is erected and ready for use and to secure the components of the handsaw in a bundle when the frame is collapsed. A second embodiment of the frame includes a pair of flexible binders and a third frame portion which, along with the first and second frame portions and the saw blade, forms a quadrilateral when the handsaw is erected and ready for use. The flexible binders can take various forms including elongated straps and flexible loops of fixed lengths. Free ends of elongated flexible binders are secured in different ways including by hook and loop fasteners and wedge configurations.

21 Claims, 4 Drawing Sheets

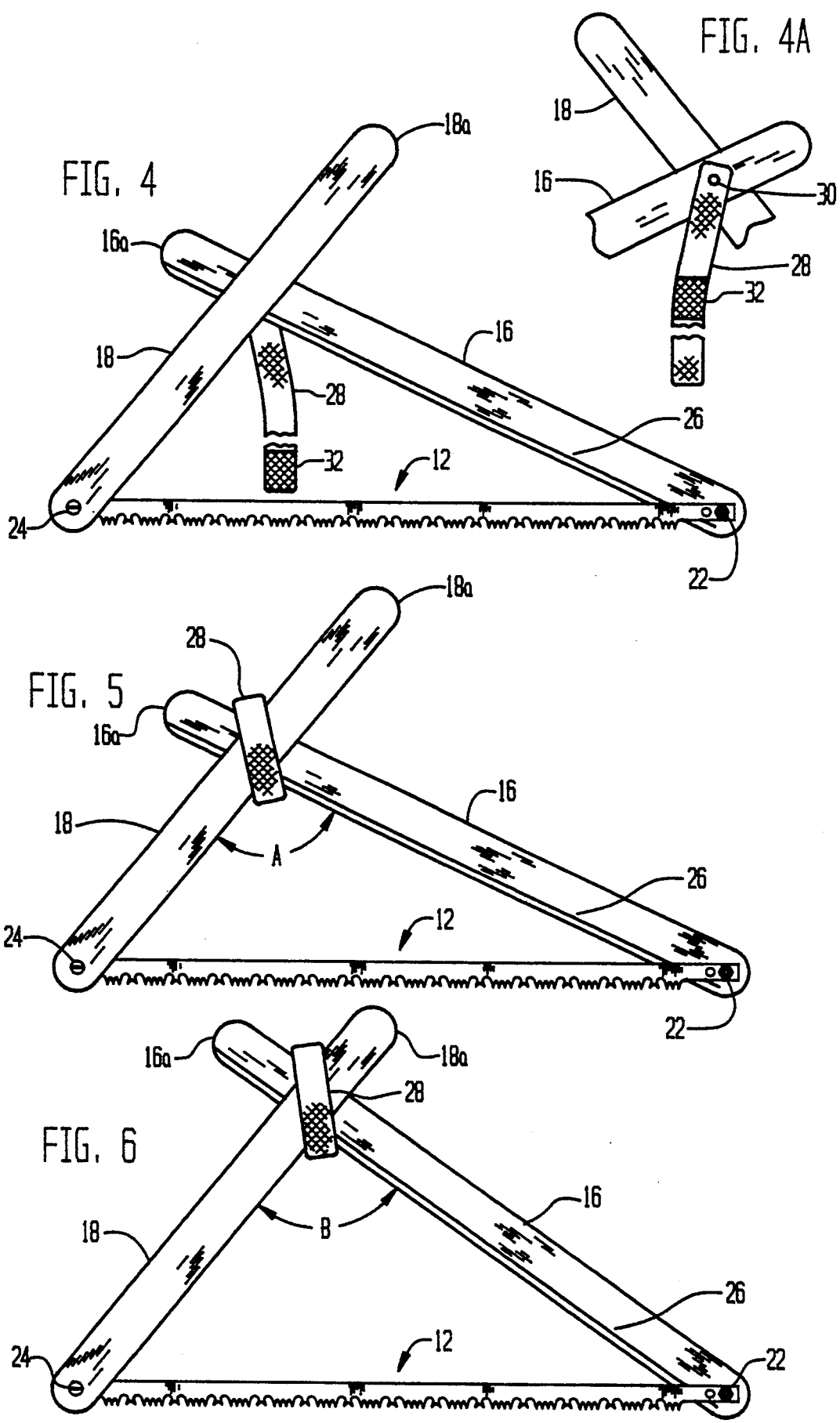

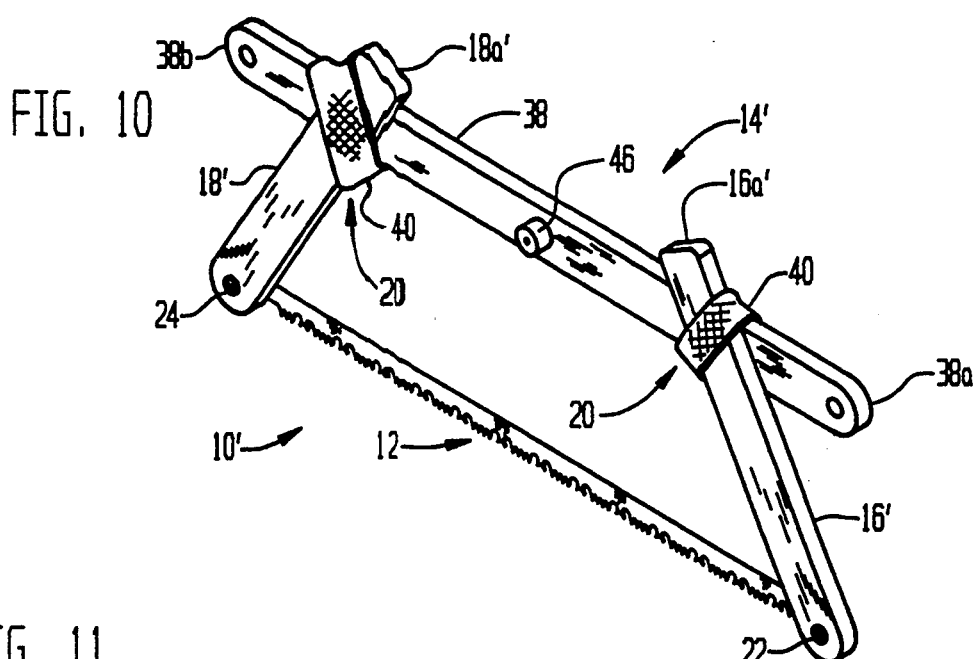
FIG. 10
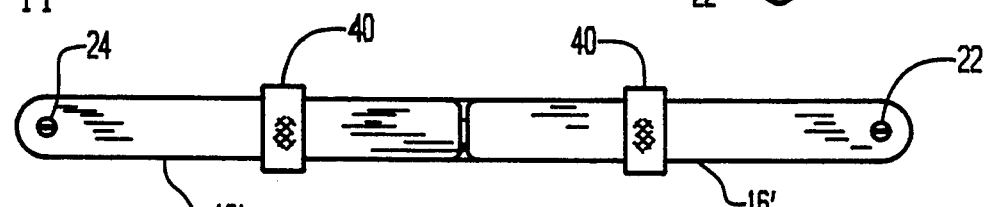
FIG. 11
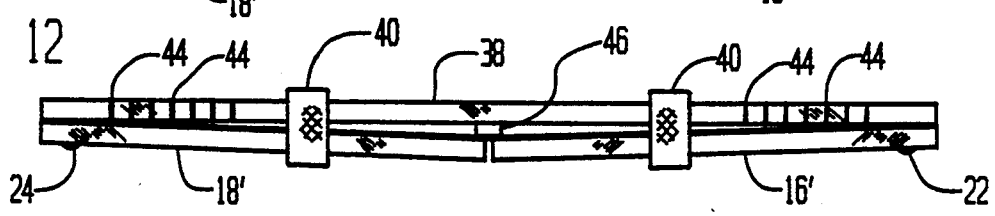
FIG. 12
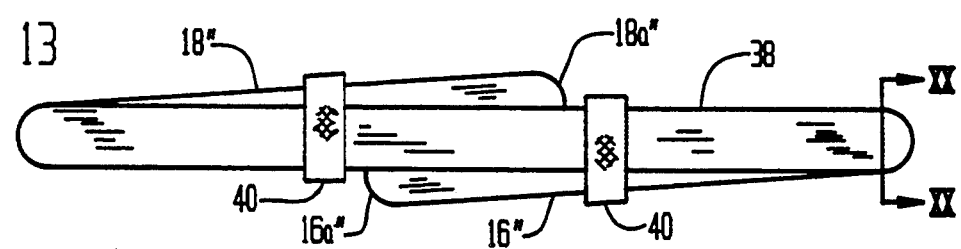
FIG. 13
FIG. 17
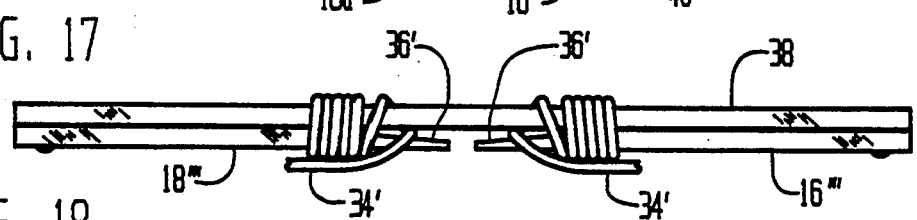
FIG. 18
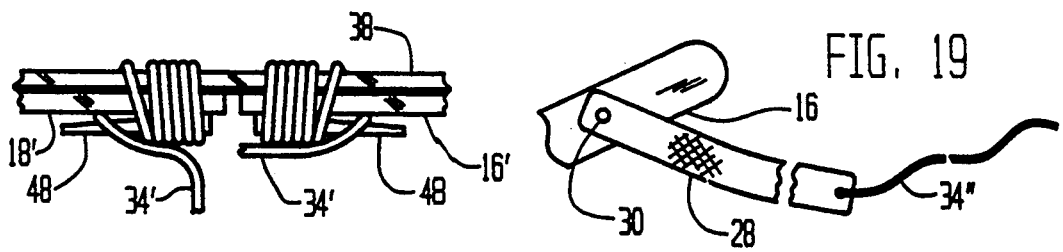
FIG. 19

COLLAPSIBLE HANDSAW

FIELD OF THE INVENTION

The present invention relates generally to handsaws, and more particularly to handsaws which have a frame that is easily collapsed for storage and transport and easily erected when the handsaw is readied for use. When erected and ready for use, the frame for the handsaw provides a handle and an arrangement for tensioning of the saw blade.

BACKGROUND OF THE INVENTION

The concept of collapsible or foldable handsaws is generally well known and the subject of numerous prior art patents. It should be noted that the inventor of the invention disclosed herein was also the inventor and patentee of a collapsible handsaw disclosed in U.S. Pat. No. 3,191,648. This previously patented handsaw has been manufactured since the issuance of the noted patent and continues to be manufactured and sold to date. The most significant drawback of a handsaw constructed in accordance with the noted patent is that the latch 16 is expensive to manufacture and adds disproportionately to the overall weight of the arrangement.

There have been numerous approaches by others to the concept of a collapsible handsaw since the above noted patent. The most common approach appears center around the inclusion of some form of a fulcrum type frame arrangement and a number of the approaches are depicted in U.S. Pat. Nos. 4,287,922, 4,186,785, 3,954,127, and 4,779,345. A variation of the fulcrum type frame arrangement for a saw blade is seen in U.S. Pat. No. 4,637,141. The idea of including an over-center type latch arrangement in the frame for a saw blade is shown in U.S. Pat. Nos. 4,580,344 and 5,208,986, and the idea of a portable handsaw as a component of another piece of camping equipment is depicted in U.S. Pat. No. 4,896,804.

Accordingly, there is a need for an improved compact collapsible handsaw which is economical, light weight, and includes a frame for the arrangement which provides for securely maintaining the handsaw in the erected condition while also providing at least one handle and means for tensioning of the saw blade. The lightweight and compact collapsible handsaw of the instant invention is not disclosed or anticipated by any prior art devices of which we are aware.

SUMMARY OF THE INVENTION

It is anticipated that a handsaw constructed in accordance with the principles of the instant invention will be primarily utilized by people who typically enjoy the out of doors. A handsaw for these people is usually a critical piece of equipment and is required to be strong, lightweight, easily assembled for use, and easily disassembled for storage and transportation. Additional requirements include that a collapsible handsaw arrangement be completely self contained and, for some people, that there be at least one version available where the possibility of the loss of any of the components of a multipart collapsible handsaw be minimized. The reasons for these basic requirements will become more readily apparent when considering the fact that a collapsible handsaw is often erected and used in the dark or in inclement weather at remote locations.

The instant invention is depicted by way of two embodiments. A first embodiment is a generally triangular configuration while a second embodiment is a quadrilateral configuration. The generally triangular handsaw arrangement includes first and second frame portions pivotally attached to opposite ends of a saw blade with the free ends of the frame portions secured relative to one another by a flexible binder when the handsaw frame is in the erected condition. Flexible binders contemplated herein can be of various forms, e.g., an elongated flexible binder in the form of web strap or cord which ideally is secured at one end to one of the frame portions so as not to be lost or an elongated flexible binder in the form of a loop of a fixed length. When strap or cord type flexible binders are used there are various provisions for the free end thereof to be secured when the binder is wrapped around and securing the frame portions relative to one another. The second embodiment, i.e., the quadrilateral configuration, includes an additional frame portion which is used to interconnect the free ends of the first and second frame portions which, like the generally triangular embodiment, are pivotally secured to opposite ends of the saw blade. This second embodiment requires a pair of flexible binders to secure the respective ends of the third frame portion relative to the free ends of the first and second frame portions. Again, the flexible binders can either be elongated flexible binders in the form of strap or cord or flexible loops of fixed lengths.

Accordingly, it is an object of the present invention to provide a collapsible handsaw which is easily erected and easily collapsed.

Another object of the present invention is to provide a novel form of frame arrangement for saw blades of all types which are typically used with bow or truss type frames.

Yet another object of the invention is to provide a self contained, collapsible handsaw arrangement which requires a minimum amount of manipulation or handling to erect and collapse the arrangement.

Still another object of the instant invention is to provide a handsaw arrangement which, when collapsed, protects the saw blade and the teeth included thereon.

And yet another object of the instant invention is to provide a handsaw arrangement which is compact and, when collapsed, floats in water.

A further object of this invention is to provide at least one embodiment of a handsaw arrangement wherein all of the components included therein are interconnected to prevent the loss of any single component thereof.

Yet a further object of the instant invention is to provide a handsaw arrangement that is light weight and economical to manufacture.

A still further object of this invention is to provide an efficient and economical arrangement for a collapsible handsaw which overcomes the problems of collapsible handsaws in the past.

It is also an object of the present invention to provide a handsaw arrangement which is durable and efficient throughout a long life of repetitious use and which at the same time is attractive in appearance.

Other objects and advantages of the present invention will be apparent and understood from the following detailed description when taken in conjunction with the accompanying drawings.

A BRIEF DESCRIPTION OF THE DRAWINGS

FIG. 4 shows the first and second frame portions positioned and ready to be secured to one another by the flexible binder, i.e., the frame portions, as depicted in FIG. 2, have been released and pivoted to positions as shown herein;

FIG. 4A is a partial view showing the other side of the free ends of the frame portions and the flexible binder as depicted in FIG. 4;

FIG. 5 is a side elevation view of the arrangement depicted in FIG. 4 showing an intermediate step in the assembly process wherein the first frame portion is secured to a midsection of the second frame portion by the flexible binder;

FIG. 6 shows the handsaw arrangement as depicted in FIG. 5 fully erected and ready for use;

FIG. 10 is a perspective view of a second embodiment of a collapsible handsaw constructed in accordance with the principles of the instant invention;

FIG. 11 is a side elevation view of the handsaw arrangement shown in FIG. 10 in a collapsed condition;

FIG. 12 is a top plan view of the collapsed handsaw arrangement as depicted in FIG. 11;

FIG. 13 is a side elevation view of a variation of the embodiment of the handsaw arrangement depicted in FIG. 10 in a collapsed condition;

FIG. 17 is a top plan view similar to FIG. 12 wherein the free ends of the frame portions are secured relative to one another by flexible binders in the form of cord;

FIG. 18 is a partial view, showing the inclusion of disparate elements for securing the free ends of elongated flexible binders;

FIG. 19 is a partial view showing a two part elongated flexible binder;

DETAILED DESCRIPTION OF THE PREFERRED EMBODIMENT

Figure 1:
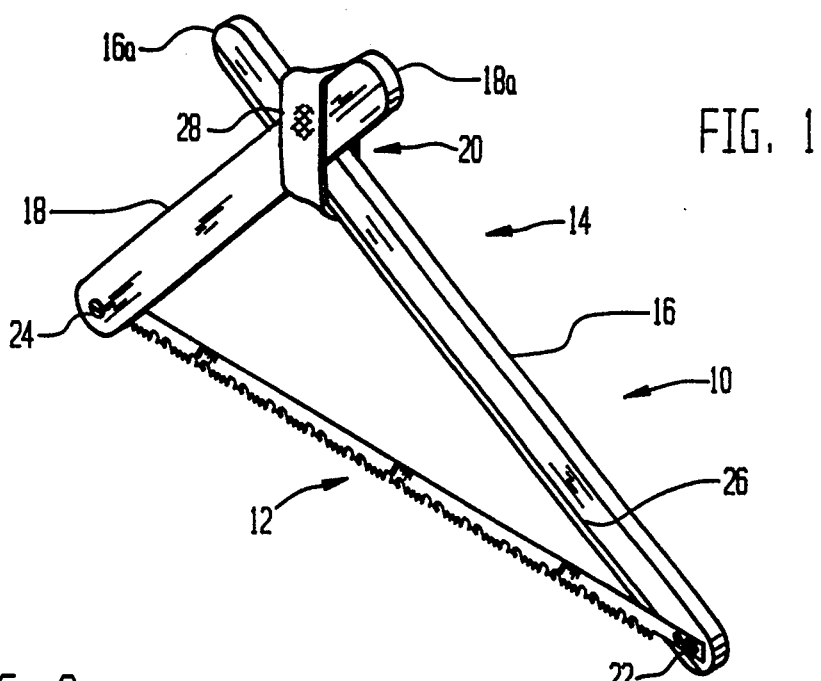
FIG. 1 is a perspective view of a first embodiment of a collapsible handsaw constructed in accordance with the principles of the instant invention.

Reference herein below is made to the drawings wherein like reference numerals have been employed to designate the same or similar components throughout the various views.

Figure 21:
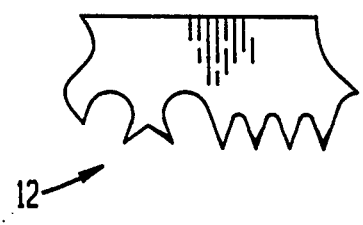
FIG. 21 is a fragmentary, side elevation view of a portion of a typical saw blade usable in a collapsible handsaw arrangement as disclosed herein.

Referring now to FIG. 1 wherein a first embodiment of a collapsible handsaw arrangement 10 is depicted as comprising a saw blade 12 and a frame arrangement 14. Frame arrangement 14 includes a first frame portion 16, a second frame portion 18, and a flexible binder 20. Saw blade 12 is preferably of a conventional cross-cut type, adapted for cutting wood and for use in connection with a bow or truss type frame. Such a blade is depicted in FIG. 21 and is adapted to cut on both the forward and backwards strokes. This type of blade is preferred because it is considered that the present invention has its greatest utility with respect to camp saws, and that the principal need of campers is for a saw that will easily and readily cut firewood, posts, structural members for camp shelters, etc. However, it is to be understood that the present invention is not limited to the type of saw blade illustrated in FIG. 21, but has utility with any type of saw blade that is or can be adapted for use with a bow or truss type frame. Examples of other forms of saw blades to which the invention relates includes pruning saws, meat saw blades, saw blades adapted for cutting plastics and saw blades adapted for cutting metals.

Figure 2:
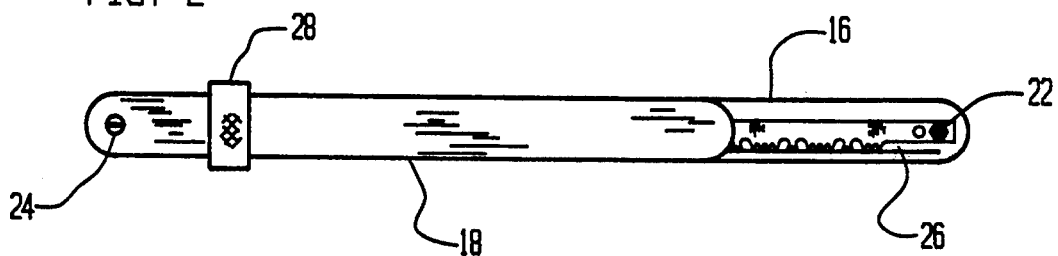
FIG. 2 is a side elevation view of the handsaw arrangement depicted in FIG. 1 in a collapsed condition.
Figure 3:
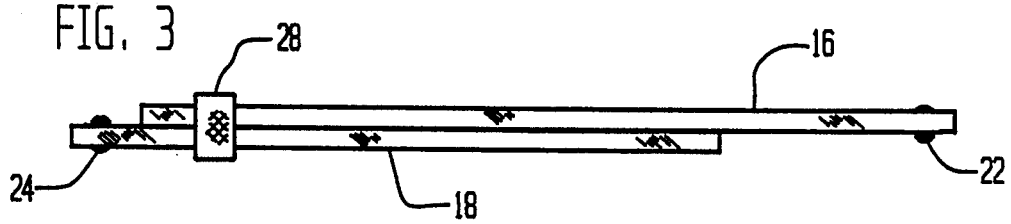
FIG. 3 is a top plan view of the collapsed handsaw arrangement as depicted in FIG. 2.
Figure 7:
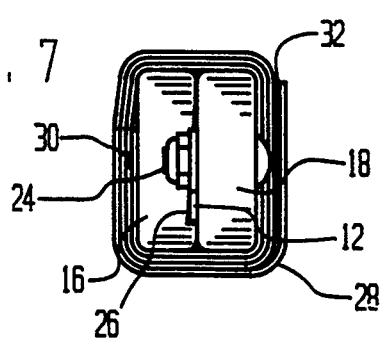
FIG. 7 is an end view looking from the left end of the collapsed handsaw arrangement as depicted in FIG. 2.

In the first embodiment of the handsaw arrangement, as depicted in FIGS. 1 through 7, first frame portion 16 is pivotally connected to one end of saw blade 12 by a pivot pin 22 and second frame portion 18 is pivotally connected to the other end of saw blade 12 by a pivot pin 24. It should be noted at this point that the frame portions can be constructed of any suitable material and preferably are made of wood for durability and the additional benefit that the arrangement will float if dropped in water. Pivot pins 22 and 24 can be bolts or rivets or any suitable connector permitting pivotal attachment of the elements, and it has been found that bolts with self locking nuts are the preferred form. First frame portion 16 is generally the length of saw blade 12 and includes a recess 26 along the length thereof such that, as best seen in FIGS. 2 and 7, the saw blade and teeth thereon are protected when the handsaw arrangement is in a collapsed condition. The second frame portion 18 is shown as being shorter than the first frame portion and, when the frame arrangement is in an erected condition, provides a handle for manipulation of the handsaw when it is being used. If it is desired that the saw blade 12 be completely encapsulated along its entire length when the handsaw is collapsed, then the first and second frame portions can both be made to be generally the length of the saw blade 12. The flexible binder 20 is depicted as being a strap 28 attached at one end to first frame portion 16 by a suitable fastener 30, e.g., a nail, proximate the free end thereof. It should be noted that strap 28 can be attached to either frame portion 16 or frame portion 18 and strap 28 has a distal or free end which includes hook and loop type fasteners 32 for securement of the strap relative to itself when it is binding the handsaw arrangement 10 in either the collapsed or erected conditions. As best seen in FIGS. 2 and 3, strap 28 will retain the handsaw arrangement 10 in the collapsed condition when the first and second frame portions 16 and 18 are generally juxtaposed and parallel to the saw blade 12 by the strap 28 being wrapped therearound and secured by the engagement of the hook and loop type fasteners 32. As best seen in FIGS. 1 and 6, flexible binder 28 is also Used to retain the handsaw arrangement 10 in the erected condition by being wrapped around the first and second frame portions and secured.

To erect the handsaw arrangement 10 and prepare it for use, strap 28 is released and unwrapped from around the collapsed handsaw arrangement and the first and second frame portions 16 and 18 are pivoted to positions wherein the free end 16a of first frame portion 16 is generally somewhere along the midsection of the second frame portion 18 (see FIGS. 4 and 4A). The flexible binder 20, i.e., strap 28, is then wrapped around the intersection of the two frame portions on the bisection of the interior angle formed thereby, i.e., angle A in FIG. 5, and secured with the hook and loop fasteners 32. Strap 28 needs to be snug but not excessively tight when wrapped around the intersection and secured in preparation for the shifting of the frame arrangement to the fully erected condition. First frame portion 16 along with the strap 28 is then slid relative to second frame portion 18 toward the free end 18a thereof with the result being that the handsaw arrangement is thereby fully erected and the saw blade 12 is tensioned. It should be noted at this point that, as end 16a of frame portion 16 is moved toward end 18a of frame portion 18, angle "A" decreases to an angle "B", as depicted in FIG. 6, and that the other interior angles in the triangular arrangement increase proportionately. The fixed lengths of either frame portion 16 or frame portion 18 and saw blade 12, and the manner in which they are secured relative to one another by pivot pins 22 and 24 and flexible binder 20, along with the changes in the angular relationships of the frame portions and saw blade relative to one another, as the handsaw arrangement 10 is shifted to the fully erected condition, results in the tensioning of the saw blade and frame arrangement. The frictional engagement of the flexible binder 20 ensures that the triangular configuration of this embodiment is maintained as a rigid structure that is ready for use. To collapse the handsaw arrangement is a simple procedure and either requires the reverse of the procedure outlined above, i.e., to slide the first frame portion 16 relative to the second frame portion 18 toward the midsection thereof and release strap 28, or to release the hook and loop fasteners 32 while the handsaw arrangement is still in the erected condition which accordingly releases the strap 28 thereby permitting the first and second frame portions 16 and 18 to be pivoted into juxtaposition relative to the saw blade 12 where the collapsed handsaw arrangement 10 can then be secured in a bundle by strap 28.

Figure 8:
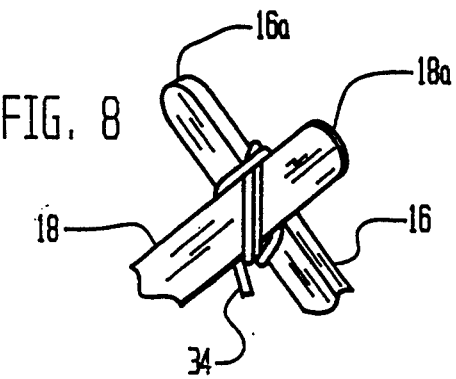
FIG. 8 is a partial perspective view of the free ends of the frame portions secured to one another by a flexible binder in the form of cord wrapped around and wedged between the frame portions.
Figure 9:
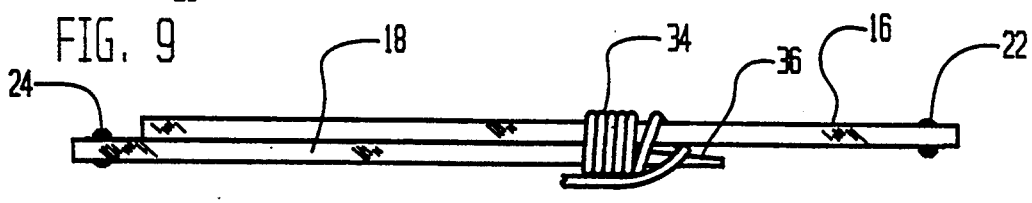
FIG. 9 is a top plan view similar to FIG. 3 showing a flexible binder in the form of cord binding the collapsed handsaw arrangement in a bundle.

With regard to FIGS. 8 and 9, an alternative to the use of hook and loop fasteners to secure the distal end of strap 28, as discussed above, is to use a strap 28 or cord 34 and incorporate rounded edges and chamfered ends 36 on the frame portions to facilitate wedging of the distal end of the strap or cord between the frame portions for securement thereof. It has been found that some types of strap material are more difficult to secure a free end thereof by wedging and, accordingly, as depicted in FIG. 19, the strap 28 can include an extension 34" in the form of a cord or a leather thong. A preferred form of attachment for the extension is to punch a hole through the end of the strap 28 and thread it therethrough. Knots tied in the cord or thong, on either side of the strap, will prevent the extension from being lost or pulled through the strap.

Figure 20:
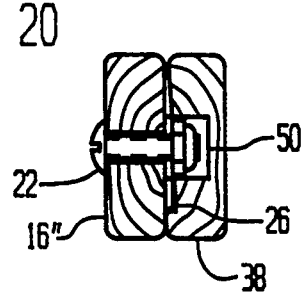
FIG. 20 is a cross-section view taken in the direction of the arrows along line XX in FIG. 13.

Referring now to FIG. 10, a second embodiment of the handsaw arrangement 10' is shown as including a third frame portion 38. As best seen FIGS. 11 and 12, first and second frame portions 16' and 18' are pivoted to opposite ends of saw blade 12 and together have a combined length which is generally equal to the length of the saw blade. A variation shown in FIG. 13, includes longer first and second frame portions 16" and 18" which provide additional benefits which will become apparent from a further understanding of the invention. Third frame portion 38, in its preferred form, is generally equal to the length of saw blade 12 such that, in the collapsed condition, as seen in FIGS. 11, 12 and 13, saw blade 12 is substantially encapsulated by the first and second frame portions on one side thereof and third frame portion 38 on the other. This embodiment requires the use of two flexible binders, which can either be of strap or cord or, as illustrated in FIG. 10, can be flexible loops 40 of generally fixed lengths. The flexible loops 40 can be of any suitable material and it has been found that web type strap wound into a loop and secured in a loop of a generally fixed length by either stitching or a rivet (not shown in detail) forms an excellent flexible binder. When flexible loops of fixed lengths are used it has been found that the inclusion of a spacer 46 to create wedge shapes in the collapsed handsaw arrangement (see FIG. 12) will permit cooperation with the flexible loops to bind the handsaw arrangement into a collapsed bundle for transportation and storage without concern for the loss of any of the components. The variation depicted in FIG. 13 does not require the inclusion of spacer 46. The longer first and second frame portions 16" and 18" abut one another and are not able to align with the saw blade and third frame portion as depicted in FIG. 11 and, accordingly, provide wedge shaped configurations which cooperate with fixed length binders 40 to retain the collapsed handsaw arrangement 10' in a bundle. Of course elongated flexible binders, as described with regard to the first embodiment, can be used with the second embodiment, and both embodiments can include serrations 44 to increase the frictional engagement of the binders with the frame portions. It should be noted that third frame portion 38 has recessed areas for receiving the protruding ends of fasteners 22 and 24 when the handsaw arrangement is bundled, an example of which is shown in FIG. 20 wherein recessed area 50 aligns with and covers the protruding end of fastener 22.

Figure 14:
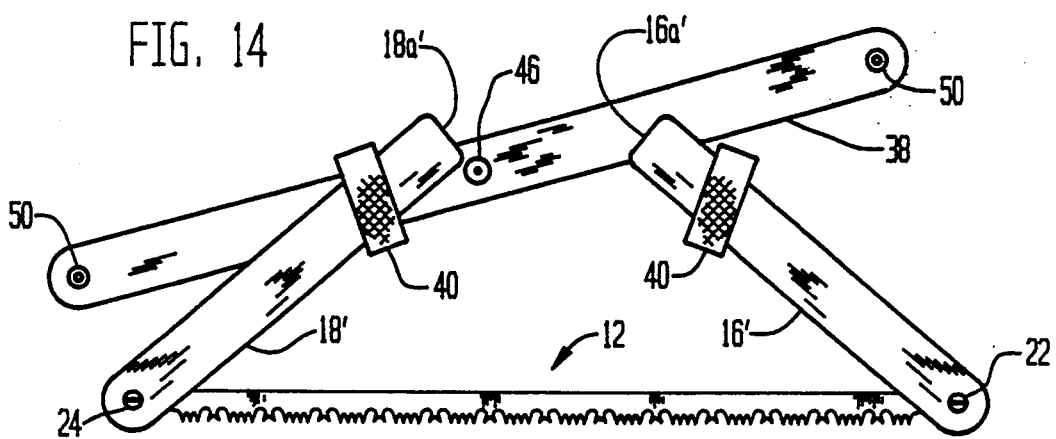
FIG. 14 is a side elevation view of the handsaw arrangement as depicted in FIG. 10 showing an intermediate stage preparatory to the handsaw arrangement being erected.
Figure 15:
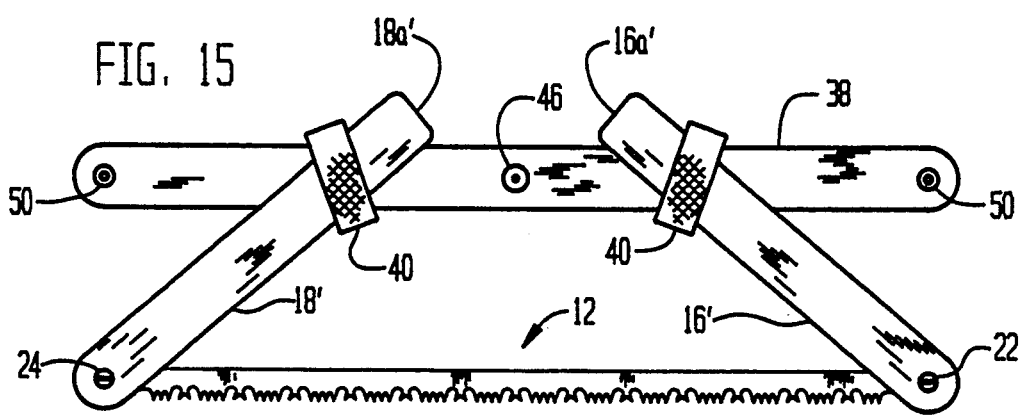
FIG. 15 is a side elevation view of the handsaw arrangement as depicted in FIG. 14, in a further preparatory stage, wherein the third frame portion is connected and arranged relative to the first and second frame portions by binders of fixed lengths and wherein the handsaw arrangement is ready to by shifted to the erected condition.
Figure 16:
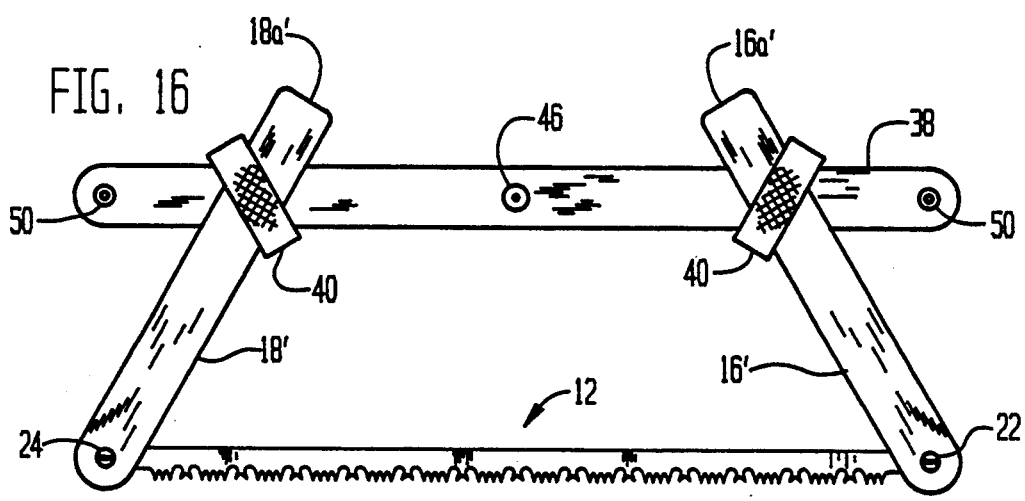
FIG. 16 is a side elevation view of the handsaw arrangement as depicted in FIG. 15 wherein the first and second frame portions have been shifted relative to the third frame portion and secured by the flexible binders wherein the handsaw arrangement is in the fully erected condition and ready for use.

Referring now to FIGS. 14, 15 and 16, the procedure for erecting the frame for the second embodiment of the handsaw arrangement is initiated by the removal of flexible loops 40 from the collapsed handsaw as depicted in FIGS. 11, 12 and 13, and then pivoting the first and second frame portions to the positions generally shown in FIG. 14. The third frame portion 38 is then assembled to the respective first and second frame portions by first sliding the loop-type binders 40 onto each respective first and second frame portions and then sliding one end at a time of the third frame portion 38 through the flexible loops. FIG. 14 shows one end of the third frame portion 38 threaded through one of the flexible loops 40 and after the second end of the third frame portion has been threaded through the other loop the arrangement generally appears as depicted in FIG. 15. Sliding of the ends 16a' and 18a' of the first and second frame portions 16' and 18', and the ends 16a" and 18a" of the first and second frame portions 16" and 18", relative to the third frame portion 38, i.e., toward the respective free ends of the third frame portion, thereby tensions the saw blade 12 and secures the handsaw arrangement created by the frame portions and the saw blade. To add as much tension as possible, an attempt can be made to shift the third frame portion 38 relative to the first and second frame portions. Accordingly, as depicted in FIG. 16, the arrangement is fully erected and the handsaw arrangement is ready for use. It should be noted that in this embodiment the first and second frame portions provide handles for the manipulation of the saw blade such that it can either be used by one person or by two people sharing in the work to be accomplished by the saw. Providing longer frame portions 16" and 18", as depicted in FIG. 13, will permit the cutting of larger diameter objects and has been found to be easier to erect.

Referring now to FIGS. 17 and 18. An alternative to the flexible loops 40 is the inclusion of either flexible strap or cord 34'. Cord 34' is preferably secured near the free ends of the first and second frame portions 16'" and 18'" and it is possible to omit any extra provision for the securement of the distal end of each of the cords by providing chamfered ends 36' at the ends of the frame portions, respectively, facing the saw blade such that when the handsaw arrangement is collapsed the cords can be wound around the collapsed handsaw and forced between the respective chamfered ends 36' of the first and second frame portions and the third frame portion to thereby secure and thus bind the collapsed arrangement in a bundle (see FIG. 17). Another alternative to the use of hook and loop fasteners or chamfered ends is the inclusion of clamping elements 48 forming wedge shaped slots such that the strap or cord can be wound around the collapsed handsaw arrangement and the distal ends thereof wedged in the V-shaped notch formed by the clamping element 48 (see FIG. 18).

While this invention has been described with a certain degree of particularity, it is manifest that many changes may be made in the details of construction and in the arrangement of components without departing from the spirit and scope of the disclosure. It is understood that the invention is not limited to the embodiment set forth herein for purposes of exemplification, but is limited only by the scope of the attached claims, including the full range of equivalency to which each element thereof is entitled.

What is claimed is:

1. A handsaw arrangement comprising a saw blade and foldable frame means, said frame means including at least two elongated frame portions, first pin means for pivotally connecting a first end of a first one of said elongated frame portions to a first end of said saw blade, second pin means for pivotally connecting a first end of a second one of said elongated frame portions to a second end of said saw blade, flexible non-rigid binder means for selectively securing said handsaw arrangement in an erected condition and a collapsed condition, said flexible non-rigid binder means including a distal end, and means for securing said distal end of said flexible non-rigid binder means, whereby said flexible non-rigid binder means can selectively bind said handsaw arrangement in a bundle when said frame means is in said collapsed condition wherein said saw blade and said elongated frame portions are juxtaposed and generally parallel, by wrapping said flexible non-rigid binder means around the frame portions and securing said distal end, and bind said handsaw arrangement in said erected condition wherein a second end of said first elongated frame portion is secured relative to a second end of said second elongated frame portion thereby providing means for tensioning said saw blade and handle means for manipulation of said saw blade wherein said handsaw arrangement can be used as a handsaw.

2. A handsaw arrangement as set forth in claim 1 wherein said flexible non-rigid binder means is elongated and fixedly secured at one end thereof proximate said second end of one of said first and second elongated frame portions.

3. A handsaw arrangement as set forth in claim 2 wherein said elongated flexible non-rigid binder means includes a flexible strap formed of webbing.

4. A handsaw arrangement as set forth in claim 3 wherein said means for securing said distal end includes cooperating hook and loop fasteners.

5. A handsaw arrangement as set forth in claim 3 wherein said means for securing said distal end includes a chamfered end at said second end of one of said first and second frame portions to facilitate insertion of said distal end between said first and second frame portions, whereby said distal end is clamped between said first and second frame portions when said flexible strap is binding said frame means.

6. A handsaw arrangement as set forth in claim 3 wherein said means for securing said distal end includes a clamping element attached to and spaced from one of said first and second frame portions, said clamping elements being adapted to receive and secure said distal end between said clamping element and said one of said first and second frame portions when said flexible strap is binding said frame means.

7. A handsaw arrangement as set forth in claim 2 wherein said flexible non-rigid binder means includes a tether formed of cord.

8. A handsaw arrangement as set forth in claim 7 wherein said means for securing said distal end includes a chamfered end at said second end of one of said first and second frame portions to facilitate insertion of said distal end between said first and second frame portions thereby securing said distal end by clamping said distal end between said first and second frame portions when said tether is binding said frame means.

9. A handsaw arrangement as set forth in claim 7 wherein said means for securing said distal end includes a clamping element attached to and spaced from one of said first and second frame portions, said clamping element being adapted to receive and secure said distal end between said clamping element and said one of said frame portions when said tether is binding said frame means.

10. A handsaw arrangement as set forth in claim 2 wherein said flexible non-rigid binder means is fixedly secured to said first frame portion and said second frame portion includes serration means, whereby said flexible non-rigid binder means can frictionally coact with said serration means for ensuring securing of said frame means of said handsaw arrangement in said erected condition.

11. A handsaw arrangement as set forth in claim 1 wherein said means for securing said distal end includes a clamping element attached to and spaced from one of said first and second frame portions, said clamping element being adapted to receive and secure said distal end between said clamping element and said one of said frame portions when said flexible non-rigid binder means is binding said frame means.

12. A handsaw arrangement as set forth in claim 1 wherein said first and second frame portions are disposed on opposite sides of said saw blade when said frame means is in said collapsed condition and one of said frame portions includes a recess along the length thereof for protecting teeth on said saw blade.

13. A handsaw arrangement as set forth in claim 12 wherein each of said first and second frame portions of said frame means includes a recess along the length thereof to substantially encapsulate said saw blade when said frame means of said handsaw arrangement is in said collapsed condition and bound in a bundle.

14. A handsaw arrangement as set forth in claim 1 wherein said frame means includes a third frame portion and said flexible non-rigid binder means includes two flexible non-rigid binder means, said third frame portion being connected to said first and second frame portions by said two flexible non-rigid binder means to thereby form, with said saw blade, a quadrilateral arrangement forming two handle portions for manipulation of said handsaw arrangement and tensioning of said saw blade when said arrangement is in said erected condition.

15. A handsaw arrangement as set forth in claim 14 wherein said two flexible non-rigid binder means includes two discrete binders, a first of said two discrete binders selectively securing a first end of said third frame portion relative to said second end of said first frame portion and a second of said two discrete binders selectively securing a second end of said third frame portion relative to said second end of said second frame portion.

16. A handsaw arrangement as set forth in claim 15 wherein the length of the said first and second frame portions together substantially equals the length of the saw blade and each of said two discrete binders includes an elongated flexible binder secured to a respective second end of said first and second frame portions, each said second end of said first and second frame portions being chamfered to facilitate insertion of each respective distal end of each respective elongated flexible binder to thereby secure said distal ends by clamping said distal ends when said elongated flexible binders are binding said frame means.

17. A handsaw arrangement as set forth in claim 15 wherein each of said two discrete binders is a flexible loop of substantially fixed length.

18. A handsaw arrangement as set forth in claim 17 wherein the length of the said first and second frame portions together substantially equals the length of the saw blade and said third frame portion includes a spacer for spacing the second end of each of said first and second frame portions from the third frame portion when juxtaposed and generally parallel thereto thereby creating wedge configurations such that each flexible loop of said two discrete binders can be slid along and wedge said handsaw arrangement securely into a bundle by being slipped over respective opposite ends of the collapsed handsaw arrangement.

19. A handsaw arrangement as set forth in claim 17 wherein the length of the said first and second frame portions together is greater than the length of said saw blade thereby precluding alignment with one another and thereby forming wedge configurations which coact with each respective flexible loop to secure the handsaw arrangement in a bundle when said handsaw arrangement is in the collapsed condition.

20. A handsaw arrangement as set forth in claim 1 wherein said second frame portion includes a mid-section and said flexible non-rigid binder means is adapted to secure said second end of said first frame portion to said mid-section of said second frame portion precedent to said frame means being shifted to said erected condition, said flexible non-rigid binder means being further adapted to permit sliding of said first frame portion relative to said second frame portion and juxtaposed frictional securement of said second end of said first frame portion relative to said second end of said second frame portion when said frame means is in said erected condition.

21. A handsaw arrangement as set forth in claim 1 wherein said flexible non-rigid binder means includes a length of strap with an extension secured to said distal end thereof.

* * * * *